United States Patent [19]  [11] 3,991,219
Kückens  [45] Nov. 9, 1976

[54] METHOD FOR MIXING A CARBONATED BEVERAGE

[75] Inventor: Alexander Kückens, Hamburg, Germany

[73] Assignee: DAGMA Deutsche Automaten und Getrankemaschinen G.m.b.H. & Co., Reinfeld, Holst., Germany

[22] Filed: Mar. 21, 1975

[21] Appl. No.: 560,797

Related U.S. Application Data

[63] Continuation-in-part of Ser. No. 536,593, Dec. 26, 1974, abandoned.

[52] U.S. Cl.............................. 426/442; 426/477; 426/590; 222/564; 222/129.4
[51] Int. Cl.² ............................................ A23L 2/00
[58] Field of Search ........ 426/477, 590, 442, 330.3; 222/1, 564, 129.4

[56] References Cited
UNITED STATES PATENTS 3,467,526  9/1969  Mitchell et al.................. 426/477 X
3,687,684  8/1972  Wentworth et al................. 426/477

*Primary Examiner*—Raymond N. Jones
*Attorney, Agent, or Firm*—Michael J. Striker

[57] ABSTRACT

A plurality of different liquid flavoring agents is accommodated at static pressure in respective compartments having bottom dispensing valves, and the interior bottom region of each compartment is placed in communication with the atmosphere above the top of the compartment. A quantity of carbonated water is discharged into an open receptacle at a location spaced from the compartment, so that it travels at atmospheric pressure towards the valves associated with the respective compartments. When the discharged quantity of carbonated water reaches the valve associated with the compartment containing the selected liquid flavoring agent, the valve of the compartment in question opens and discharges a preselected amount of the liquid flavoring agent into the carbonated water with which the flavoring agent becomes mixed to form a finished beverage that can be dispensed.

7 Claims, 10 Drawing Figures

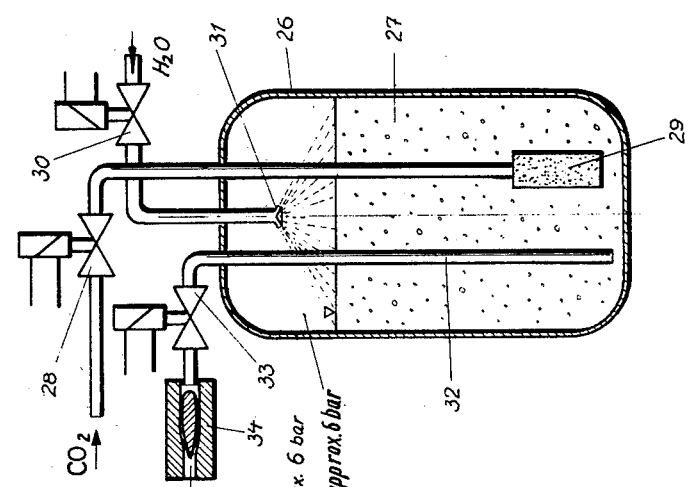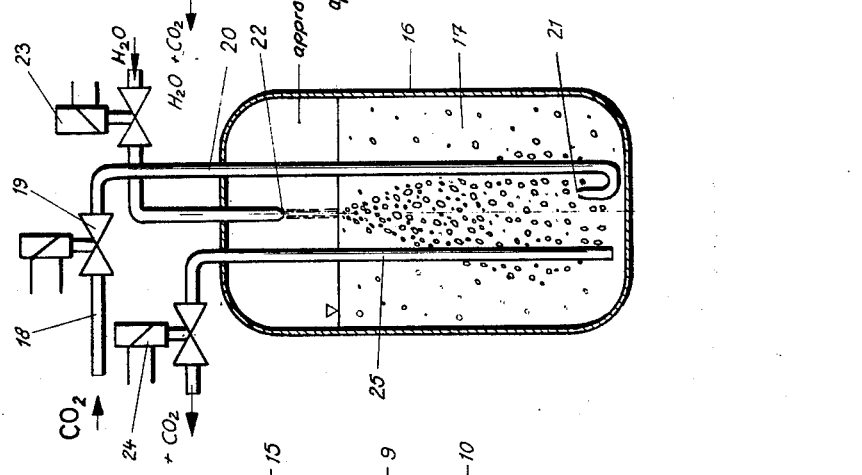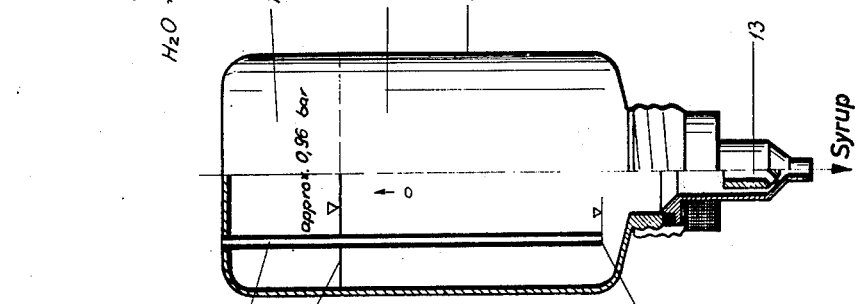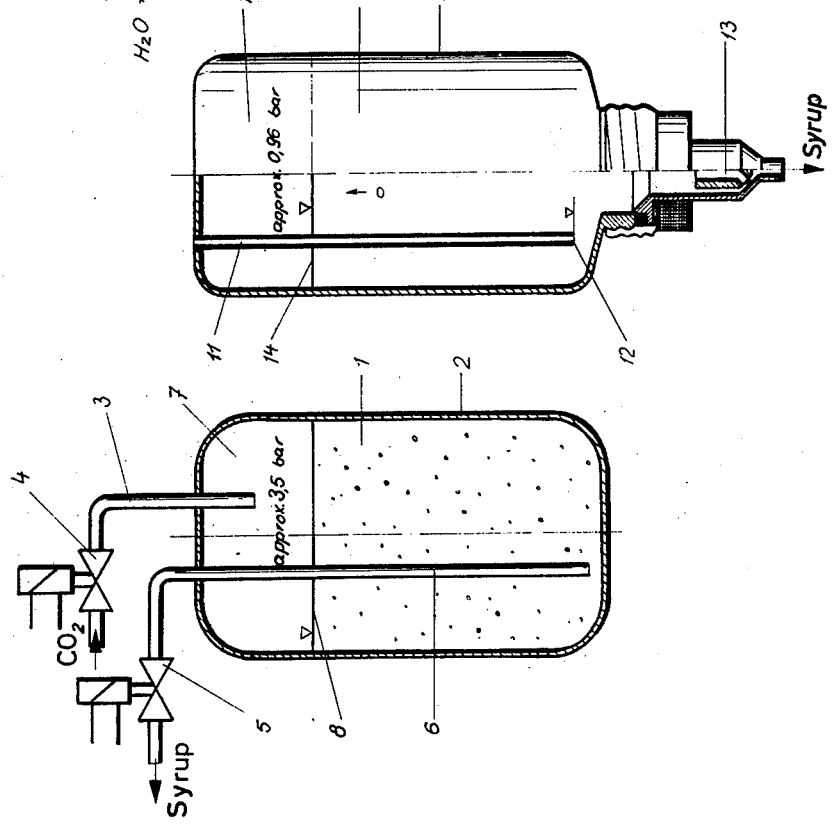

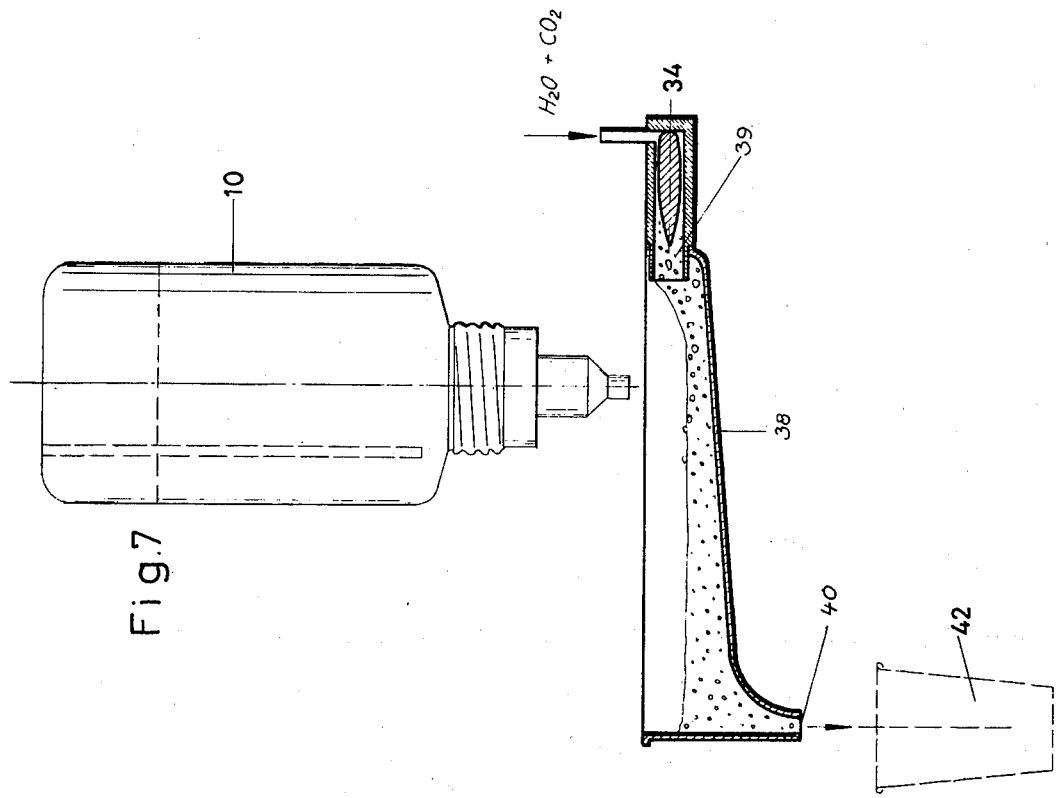

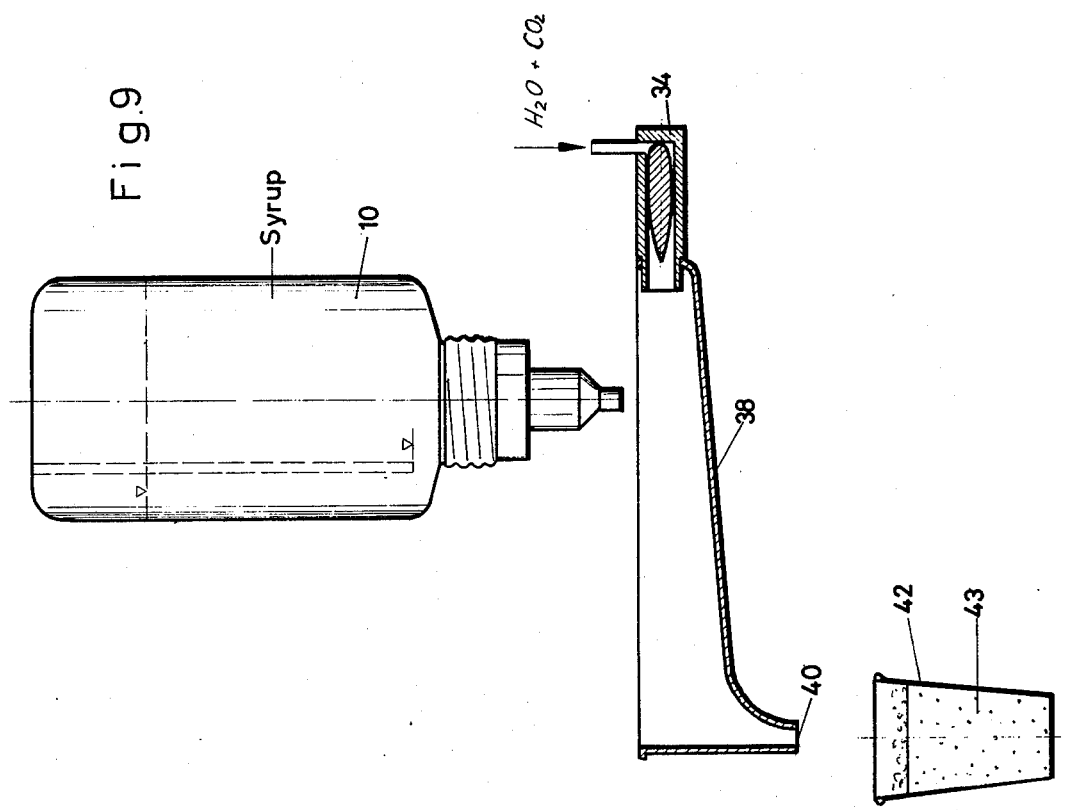
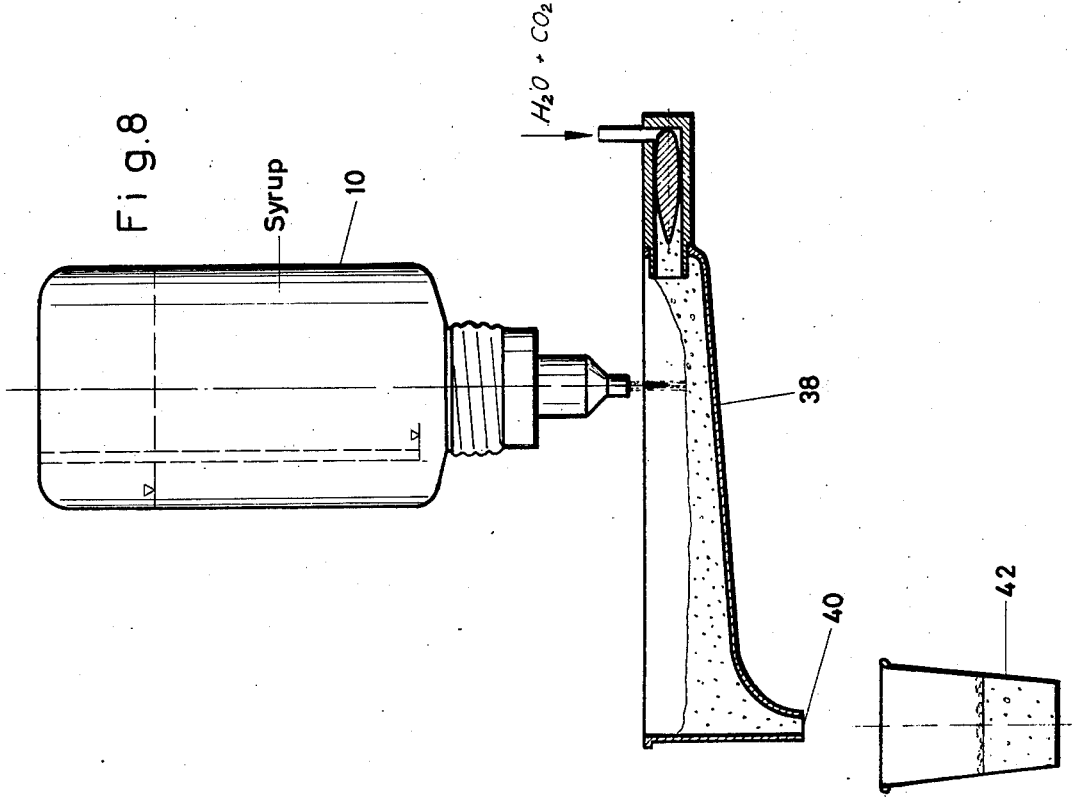

METHOD FOR MIXING A CARBONATED BEVERAGE

BACKGROUND OF THE INVENTION

This is a continuation-in-part of my copending application Ser. No. 536,593, filed on Dec. 26, 1974 and now abandoned.

The present invention relates generally to the mixing of carbonated beverages, and more particularly to a method of and an apparatus for effecting such mixing without pressure.

In the automatic production of carbonated beverages, for example cola-type beverages, orange drinks, lemonade drinks and the like, aromatic flavoring agents in liquid form, e.g. syrups and concentrates, are used which are supplied at certain pressures to a discharging valve which discharges a predetermined quantity of the respective flavoring agent into carbonated water. The carbonated water is transported in pressurized supply lines into a mixing head where it becomes mixed with the quantity of flavoring agent to form a finished beverage that may be dispensed, for example in a soft drink dispensing machine.

Widespread as this approach is, it has certain disadvantages which make improvements in this state of the art highly desirable.

In particular, the equipment required is very complicated, requiring many containers, conduits and the like. Moreover, in order to obtain a readier mixing between the liquid flavoring agent and the carbonated water, the prior art can use only liquid flavoring agents with a limited sugar content, that is flavoring agents whose Brix number does not exceed a maximum of 56. Even under these circumstances it is observed that sugaring, crystallization or other clogging of the pressure lines, valves and containers may occur. Aside from the manner in which this interferes with the proper operation of the dispensing equipment, this relatively low Brix number has the disadvantage that the flavoring agents are not self-conserving, because up to 60 Brix the flavoring agents are not inherently sterile and must therefore be made sterile by applying heat or adding preservatives to them.

A further disadvantage of the prior art has to do with the carbonating of the water. The prior art systems have a certain $CO_2$ content in the cooled water. The carbonated water is supplied under pressure to the dispensing point in the immediate vicinity of which the liquid flavoring agent is added to the carbonated water. As soon as the carbonated water leaves the dispensing valve and moves into conditions of atmospheric pressure, turbulences result due to the expansion which takes place, so that a part of the $CO_2$ content becomes lost. This loss is further increased in that the mixing between carbonated water and liquid flavoring agent takes place at a time at which the turbulences resulting from the expansion have not yet quieted. All of the prior-art devices operating on this principle, the so-called "post-mix devices," operate at this disadvantage and are incapable of imparting to the dispensed beverage as high a $CO_2$ level as is for instance present in a similar carbonated beverage contained in a bottle or can. Attempts to increase the $CO_2$ content in the dispensed beverage by increasing the amount of $CO_2$ admitted into the water to carbonate the same produce in the dispensed beverage a head which is not acceptable and which, furthermore, again results in $CO_2$ losses.

SUMMARY OF THE INVENTION

Accordingly, the present invention aims to overcome the disadvantages of the prior art.

More particularly, the present invention relates to a method of mixing a carbonated beverage which overcomes the aforementioned disadvantages.

It is another object of the present invention to provide such an improved method on which it is possible to obtain carbonation values for a dispenser-supplied beverage which are substantially equal to the carbonation values obtained in a carbonated beverage that is supplied in a can or bottle, and which in most instances are even better.

A particular object of the invention is to provide such a method which is carried out completely without pressurization of any of the components, that is wherein the mixing of the components is carried out without any kind of pressure and without turbulence.

A further object is to provide an apparatus for carrying out the invention.

In keeping with these objects, and with others which will become apparent hereafter, one feature of the invention resides in a method of mixing a carbonated beverage which comprises the steps of confining at least one liquid flavoring agent at static pressure in a compartment having a bottom dispensing valve, and placing the interior bottom region of the compartment in communication with the atmosphere above the top of the compartment. A quantity of carbonated water is then admitted into an open receptacle for travel towards the valve, and the valve is opened when the travelling carbonated water has arrived at the same, to dispense a predetermined amount of flavoring agent into the flowing water for mixing with the same to form a beverage, whereupon the beverage is dispensed for consumption.

The present invention makes it possible to add juices, syrups and concentrates, including for example alcohol-containing agents, to carbonated water without requiring any pressure at all for the mixing. The carbonated water travels in an open conduit e.g. a trough which is open to the ambient atmosphere, and it becomes mixed with the dispensed quantity of flavoring agent to form a finished carbonated beverage having the desired $CO_2$ content. An absolutely homogenous mixing of the water and the flavoring agent is assured under all circumstances, even if the syrup or concentrate has so much sugar content that it is self-conserving, that is if it has a Brix number of between substantially 60 and 70.

To obtain the best results, I employ a so-called fine-impregnation of the water with $CO_2$, that is the $CO_2$ bubbles are so small in diameter that during the mixing process they have only a relatively small buoyancy with the result that the $CO_2$ tends to escape in the usual sense only at the time at which the finished beverage has already been dispensed into a drinking receptacle, and its temperature begins slightly to increase. Premature losses of $CO_2$ are thereby avoided.

The invention overcomes a worldwide and long-standing prejudice, which holds that if the carbonated water is mixed with the syrup or concentrate at atmospheric pressure, all or most of the $CO_2$ will escaped by the time the finished beverage can be dispensed, and that in any case proper mixing at atmospheric pressure is not possible in this type of equipment.

When water or any other liquid is carbonated, the carbon dioxide gas will form either large or small bubbles, sometimes both. If the bubbles are predominantly large, the liquid is said to be "coarse impregnated" because of the "coarse" (i.e. large) bubbles. Conversely, a liquid charged with small $CO_2$ bubbles is said to be "fine impregnated." Large bubbles can be obtained without trouble; small bubbles are difficult to produce and it is in practice impossible to charge a liquid with fine bubbles without at the same time also obtaining a certain proportion of coarse bubbles.

Moreover, the ratio of fine bubbles to coarse bubbles changes drastically during handling of the charged liquid, i.e. during transportation and dispension, as a result of turbulence. For example, when one shakes a can of beer of soda, the liquid in the same is agitated during the shaking. Fine $CO_2$ bubbles impact one another during the turbulence resulting from the agitation, and merge to form larger bubbles. Since these have substantially greater buoyancy than the smaller bubbles, they escape from the liquid immediately upon opening of the can, producing the familiar foaming which every one has experienced when opening a carbonated can or bottle that was agitated. This amount of $CO_2$ is therefore immediately lost from the beverage.

Conditions analogous to the aforementioned agitation obtain in the prior-art dispensing devices for carbonated beverages. The liquids to be mixed, e.g. syrup and carbonated water, are fed in pressurized conduits to the dispension point. Due to its flow turbulence, the carbonated water at this time already includes a substantial proportion of large $CO_2$ bubbles. During mixing of the liquids, turbulence is deliberately encouraged in order to obtain a homogenous admixture of the liquids before dispensing. In this turbulent state the beverage is admitted into the drinking container, e.g. a paper cup. Considering the earlier example of an agitated can, it is not surprising that at the time of entry into the cup the beverage contains so large a proportion of large $CO_2$ bubbles — which immediately escape under formation of foam — that its $CO_2$ content is rather low by the time it reaches the consumer.

As mentioned earlier, the foam formation can be reduced by adding less $CO_2$ to the water. This is evidently self-defeating since the finished beverage will then have a still lower carbonation.

Another disadvantage of the prior art is the fact that the flavoring agent, e.g. the syrup or concentrate, especially a cola syrup, itself usually contains a certain gaseous component which further contributes to the foam formation. This problem can be overcome in the prior art by special measures to remove the gaseous component, e.g. by subjecting the syrup after manufacture but before packing to the action of vacuum. However, it is evident that this involves additional operations and increases the manufacturing expense.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a diagrammatic vertical section, illustrating how flavoring agent is dispensed in the prior art;

FIG. 2 is a view similar to FIG. 1, but showing how the flavoring agent is dispensed according to the present invention;

FIG. 3 is a diagrammatic vertical section, illustrating how water is carbonated in dispensers of the prior art;

FIG. 4 is a view similar to FIG. 3, but showing how the water is carbonated in accordance with the present invention;

FIGS. 5 and 6 are two diagrammatic vertical sections, showing how carbonated water and flavoring agent are dispensed and mixed with one another in the prior art;

FIG. 7 is a diagrammatic vertical section showing those parts of a dispensing apparatus according to the present invention, which are necessary for an understanding of the invention;

FIG. 8 shows the apparatus of FIG. 7 during the discharge of flavoring agent into carbonated water;

FIG. 9 shows the apparatus of FIGS. 7 and 8 upon completion of the dispensing operation.

DESCRIPTION OF THE PREFERRED EMBODIMENTS

Figure 10:
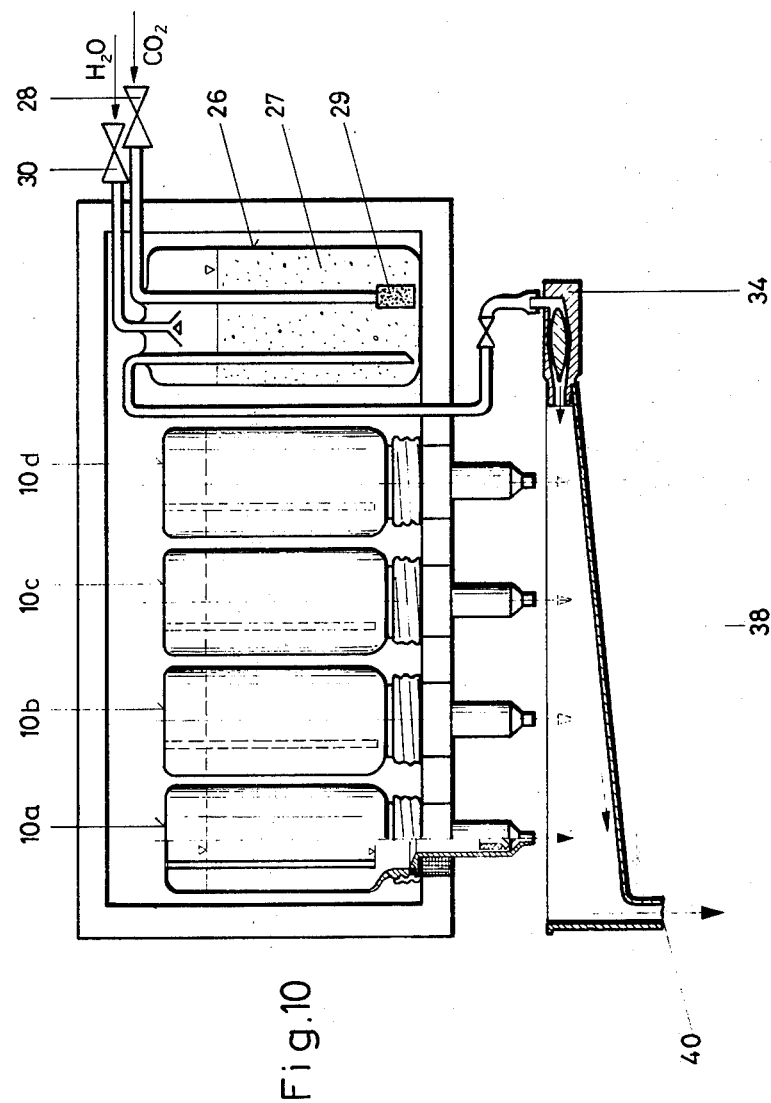
FIG. 10 shows an apparatus of the present invention which is capable of selectively dispensing a plurality of flavoring agents.

No attempt has been made in the drawing to illustrate details which are already well known to those skilled in the art. The drawing does, however, juxtapose the prior art teachings with the present invention in several Figures.

FIGS. 1 and 2 are concerned with the dispensing of flavoring agents, e.g. liquid concentrates or syrups. As FIG. 1 shows, the prior art does this under pressure. For this purpose, a liquid flavoring agent 1 is stored in a container 2. The space 7 above the liquid level 8 communicates with a conduit 3 through which $CO_2$ under pressure is admitted via a valve 4. An outlet conduit 6 has its lower end located in the liquid 1, adjacent the bottom of container 2. When the valve 5 of conduit 6 is opened, the pressure of the $CO_2$ will force liquid 1 out of the container 1 in a turbulent flow. This turbulence will be further increased by any residual gaseous components that may still be present in the liquid 1 from its manufacture, unless they have been previously removed by a separate manufacturing step. In any case, however, the turbulence of the discharged liquid will, when the latter mixes with carbonated water, cause a loss of $CO_2$.

By contrast, the present invention uses a flavoring agent dispensing principle that was first disclosed in my prior U.S. Pat. No. 3,258,166. As shown in FIG. 2, the container 10 is arranged with its outlet facing downwardly. A vent tube 11 extends through the liquid flavoring agent 9 to the region of the downwardly directed endwall of the container 10; its upper end communicates with the atmosphere above the container 10. Therefore, the static pressure level for liquid 9 being discharged by the electromagnetic valve 13 is located at 12. Where the prior art has elevated pressure in the space 7 above the liquid 1, the present invention has underpressure in the space 15 above the level 14 of liquid 9; because of this, any gases contained in the liquid 9 can rise into space 15 and cannot cause turbulence and $CO_2$ loss when liquid 9 becomes mixed with carbonated water. Also, a separate processing step for degasification of the liquid 9 is thereby avoided.

A further aspect of the invention is compared with the prior art in FIGS. 3 and 4. FIG. 3 shows a prior art device for charging, i.e. carbonating, a liquid such as water. A container 16 accommodates a body of carbonated liquid 17. A conduit 20 extends into the body of liquid 17 and has its outlet nozzle 21 located near the container bottom. The conduit 20 communicates with a $CO_2$ supply conduit 18 via a valve 19. An outlet conduit 25 for carbonated liquid 17, e.g. water, is controlled by valve 24 and has its inlet located near the container bottom. Fresh water, to replace the quantities which are withdrawn via conduit 25, is admitted via conduit 22 and valve 23. This water is admitted under pressure in form of a stream which creates turbulence in the body of liquid 17 and causes smaller bubbles to unite into larger bubbles which, when water is dispensed via conduit 25, rapidly escape and cause the formation of foam.

The manner in which the liquid is charged with $CO_2$ according to the invention is shown in FIG. 4, wherein a container 26 accommodates carbonated water 27. A conduit, controlled by a valve 28, admits $CO_2$ into the water 27, but not through a nozzle as in FIG. 3. Instead, the $CO_2$ is made to pass through a member 29 of a material having fine pores, e.g. ceramic body. The $CO_2$ therefore can form only small bubbles in the water 27. Turbulence is avoided, since the incoming replacement water is admitted via valve 30 and a misting nozzle 31, so that it becomes atomized and settles gently onto the surface of liquid 27, instead of penetrating the liquid in form of a turbulence-producing stream. The charged water 27 is withdrawn through conduit 32 and via an expansion nozzle having a generally tear-drop shaped member 34.

Having described how the prior art supplies its carbonated water and the flavoring agent, it is now time to consider how these liquids are dispensed in the prior art. This is shown in FIGS. 5 and 6.

The two liquids to be mixed, i.e. the carbonated water and the flavoring agent (e.g. syrup) are discharged from outlet passages S' and S'' of a spray head at dispensing head H. Both liquids are under pressure and the two passages are so oriented that the streams of liquid discharged from them will impinge one another. The purpose is to obtain intimate mixing, but the actual disadvantageous result is the development of such stray turbulence that a large number of large $CO_2$ bubbles forms which promptly escape. This formation of the large bubbles is graphically shown in the partially filled cup 35 in FIG. 5; in FIG. 6 it will be seen that by the time the cup 35 is completely filled, there will be so many of the large bubbles that they will form a substantial "head" of foam on top of the beverage in the cup. All of the $CO_2$ which has gone into forming the head is, of course, lost from the beverage. Additional amounts of $CO_2$ have been lost into the atmosphere by this time. The end result is that a beverage dispensed in this manner after the teaching of the prior art will have considerably less of a $CO_2$ content than the same beverage would have if it were supplied in a bottle or can instead of from a dispensing machine.

By contrast to FIGS. 5 and 6, the manner in which the beverage is dispensed according to the present invention is shown in FIGS. 7 - 9.

In these FIGS. 7 - 9, reference numeral 38 identifies a conduit (e.g. a trough) which is open to the atmosphere. In the region of one end it has the expansion nozzle 34 through which it receives carbonated water from the container 26 (see FIG. 4); in the region of its other end it is provided with a beverage-dispensing outlet 40. The nozzle 34 and outlet 40 could, of course, also be otherwise positioned. Arranged above the trough 38 is a container 10 (see FIG. 2) for dispensing of a flavoring agent.

It should be appreciated that even the special measures taken by the present invention in the handling of the flavoring agent and the carbonated water cannot entirely preclude the presence of some of the large $CO_2$ bubbles in the water. As will be clear from the preceding description, such large $CO_2$ bubbles will cause turbulence when the beverage enters the cup 42 or other utensil (compare the description of FIGS. 5 and 6). Clearly, a large $CO_2$ bubble in the cup 35, which rises rapidly to the surface of the beverage, will carry along with it one or more of the small bubbles and cause a net loss of $CO_2$.

Such residual large $CO_2$ bubbles as are present in the carbonated water 39 despite the precautions taken with reference to the contents of containers 10 and 26, are eliminated in trough 28. The height of water 39 flowing in the trough 38 is relatively low; therefore, the highly buoyant large $CO_2$ bubbles rise to the surface substantially immediately after the water issues from expansion nozzle 34, and are lost in the atmosphere, leaving behind water which contains almost exclusively small $CO_2$ bubbles which, due to their much lower buoyancy, will not so escape.

The loss of the large $CO_2$ bubbles is not quite complete by the time the water issuing from expansion nozzle 34 reaches the outlet of the container 10. The electromagnetic valve of the latter is now energized (see FIG. 13 of U.S. Pat. No. 3,258,166) to discharge a predetermined amount of liquid flavoring agent into the flowing water 39. Residual large $CO_2$ bubbles, which continue to escape during further travel from container 10 to outlet 40, aid in mixing of flavoring agent and water, so that a complete homogeneous mixture is obtained by the time the beverage reaches the outlet 40. Only a very slight head will develop in the cup 42, primarily due to the impingement of the beverage upon the wall of the cup.

The termination of the dispensing cycle is shown in FIG. 9, where the trough 38 is empty and the beverage 43 is in the cup 42, ready for drinking. Tests have shown that the thus dispensed beverage contains more $CO_2$ than similar bottled or canned beverages.

Moreover, due to the fine-impregnation with samll $CO_2$ bubbles, this beverage can -- after dispensing -- be allowed to sit in the open for a much longer time than previously possible, without losing its carbonation, since the small $CO_2$ bubbles do not have any pronounced tendency to escape from the beverage. The fact that no pronounced head forms during dispensing means that the total amount of beverage required to fill the cup or glass can be dispensed very rapidly.

The embodiment of FIG. 10 corresponds in all essential details to that of FIGS. 7 - 9, and like reference numerals identify like components. The difference is in the provision of a plurality of containers 10A–10d of which each contains a different flavoring agent. For example, container 10a may contain cola syrup, container 10b orange syrup, container 10c cherry syrup, and so on. The timer (not shown, but see U.S. Pat. No. 3,258,166) must of course be so set that, depending upon which of the flavoring agents is selected by a user (e.g. with the usual pushbutton control, not shown), the electromagnetic dispensing valve of the proper container 10a, 10b, 10c, or 10d will be operated at the time the dispensed carbonated water reaches the location beneath the container in question.

Evidently, there could be more or fewer than four containers for flavoring agents. It is also clear that the carbonated water in container 26, and advantageously also the flavoring agents in containers 10a–10d, may be cooled. In fact, in view of public preference for cooled beverage, they usually will be cooled; details of the equipment required are known to those skilled in the art. Cooling of the flavoring agents, e.g. syrup, also serves to maintain them at the viscosity which is desired for best dispensing.

Tests have shown that the present invention makes it possible to dispense a carbonated beverage which has a higher $CO_2$ content than identical canned or bottled carbonated beverages, while requiring substantially less complicated equipment. Furthermore, due to the possibility of using self-conserving flavoring agents (i.e., flavoring agents having a high Brix number), the packaging of the flavoring agents for storage and transport is less expensive. The need for complicated pressurizing and valve equipment, pumps, and the like, which exists in the prior art because of pressurized dispensing of the components to be mixed, is eliminated.

While the invention has been illustrated and described as embodied in the dispensing of beverages, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing a mixed carbonated beverage, comprising the steps of conducting a stream of carbonated water having large and small bubbles therein at atmospheric pressure and in streamlined flow through a receptacle open to the atmosphere from an inlet to an outlet thereof, the distance between the inlet and the outlet being sufficient to permit the large bubbles to escape from the stream; confining a liquid flavoring agent in a container having a bottom dispensing valve at a location which is spaced downstream from the inlet by a distance sufficient for the large bubbles to substantially escape intermediate the inlet and said location; maintaining the pressure within the container at such a value that the flavoring agent is substantially at atmospheric pressure in the region with the atmosphere; discharging the flavoring agent at atmospheric pressure through the dispensing valve into the stream of carbonated water at said location so that the flavoring agent is mixed with the carbonated water with the aid of residual escaping large bubbles whereby a homogeneous mixture of the flavoring agent with the carbonated water is obtained downstream of the dispensing valve; and dispensing the mixture from the receptacle through the outlet thereof in form of a mixed carbonated beverage suited for consumption.

2. A method as defined in claim 1, wherein said flavoring agent contains sugar and has a Brix number of between 60 and 70.

3. A method as defined in claim 2, wherein said flavoring agent is a syrup.

4. A method as defined in claim 2, wherein said flavoring agent is a concentrate.

5. A method as defined in claim 1; and further comprising the step of micro-carbonating the water prior to the conducting step.

6. A method as defined in claim 1, wherein said maintaining step includes sealing the interior of said container with respect to the exterior thereof, and communicating said region of the dispensing at said valve with the exterior of the container so that the liquid flavoring agent in such region is at atmospheric pressure and the weight of a column of the liquid flavoring agent above such region is compensated for by subatmospheric pressure prevailing above the upper level of the liquid flavoring agent in the sealed container.

7. A method as defined in claim 1; and further comprising the additional steps of confining at least one different liquid flavoring agent in a different container having a bottom dispensing valve at a different location along the stream, and maintaining the pressure within the additional container, said additional confining and maintaining steps being similar to said confining and maintaining steps; and wherein said discharging step includes discharging a selected one of the flavoring agents through the respective valve into the stream of carbonated water.

* * * * *